(12) United States Patent
Jarysek et al.

(10) Patent No.: US 12,480,517 B2
(45) Date of Patent: Nov. 25, 2025

(54) SEALING ASSEMBLY FOR A SHAFT PASSAGE OPENING FOR A FAN

(71) Applicant: Pittway Sarl, Rolle (CH)

(72) Inventors: Kay Jarysek, Rolle (CH); Martin Petersmann, Rolle (CH); Gerrit Wascher, Rolle (CH); Martin Koelker, Rolle (CH)

(73) Assignee: Pittway Sarl, Rolle (CH)

( * ) Notice: Subject to any disclaimer, the term of this patent is extended or adjusted under 35 U.S.C. 154(b) by 0 days.

(21) Appl. No.: 18/555,579

(22) PCT Filed: Apr. 4, 2022

(86) PCT No.: PCT/EP2022/058902
§ 371 (c)(1),
(2) Date: Oct. 16, 2023

(87) PCT Pub. No.: WO2022/218742
PCT Pub. Date: Oct. 20, 2022

(65) Prior Publication Data
US 2024/0200566 A1 Jun. 20, 2024

(30) Foreign Application Priority Data
Apr. 16, 2021 (EP) .................................. 21169027

(51) Int. Cl.
*F04D 29/10* (2006.01)
*F04D 19/00* (2006.01)
(Continued)

(52) U.S. Cl.
CPC ......... *F04D 29/102* (2013.01); *F04D 19/002* (2013.01); *F04D 29/043* (2013.01);
(Continued)

(58) Field of Classification Search
CPC .... F04D 29/102; F04D 25/088; F04D 29/043; F04D 29/046; F04D 29/059; F04D 29/083; F04D 19/002
See application file for complete search history.

(56) References Cited

U.S. PATENT DOCUMENTS 3,997,805 A * 12/1976 Dochterman ............ F16J 15/36
310/90
8,303,184 B1 * 11/2012 Lebkuchner ........ F04D 13/0626
310/90
(Continued)

OTHER PUBLICATIONS

International Search Report and Written Opinion in PCT International Application No. PCT/EP2022/058902 mailed Aug. 5, 2022.

*Primary Examiner* — Andrew J Marien
(74) *Attorney, Agent, or Firm* — Greenberg Traurig, LLP; Ryan D. Sharp; David J. Dykeman (57) ABSTRACT

The present disclosure describes a sealing assembly (100) for sealing a shaft (150) passage opening (141) comprising: a rotatable motor shaft (150) with at least one bearing (161) which is supported by at least one bearing support (170), a motor plate (140) with a passage opening (141) for the motor shaft (150) with the at least one bearing (161), a seal (110) having a first scaling portion (111) and a second scaling portion (112), wherein the first sealing portion (111) is arranged between at least a portion of an outer peripheral surface of the at least one bearing (161) and a portion of the bearing support (170); and the second scaling portion (112) extends radially outwardly in a direction away from the motor shaft (150) and is fixed against radial and axial displacements on the motor plate (140) by fixing means, wherein the second sealing portion (112) is spaced from an edge of the passage opening (141).

15 Claims, 4 Drawing Sheets (51) Int. Cl.
*F04D 29/043* (2006.01)
*F04D 29/046* (2006.01)
*F04D 29/059* (2006.01)
*F04D 29/08* (2006.01)

(52) U.S. Cl.
CPC ......... *F04D 29/046* (2013.01); *F04D 29/059* (2013.01); *F04D 29/083* (2013.01)

(56) References Cited

U.S. PATENT DOCUMENTS

| | | | | |
|---|---|---|---|---|
| 2015/0152872 A1* | 6/2015 | Horng | ................... | H02K 5/136 |
| | | | | 415/208.1 |
| 2023/0160471 A1* | 5/2023 | Barroso | ................ | F16J 15/104 |
| | | | | 428/34.1 |

* cited by examiner

SEALING ASSEMBLY FOR A SHAFT PASSAGE OPENING FOR A FAN

CROSS-REFERENCE TO RELATED APPLICATIONS

This application is a U.S. National Phase patent application under 35 U.S.C. 371 of International Application No. PCT/EP2022/058902, filed Apr. 4, 2022, which claims priority to and the benefit of EP Application Serial No. 21169027.6, filed Apr. 16, 2021, each of which are incorporated herein by reference in their entireties.

FIELD OF THE DISCLOSURE

The present disclosure relates to a sealing assembly, a method for assembling a sealing assembly, and a method for verifying tightness of a sealing assembly and finds particular, although not exclusive, utility in providing a sealing assembly having particularly desirable sealing properties.

BACKGROUND

Radial fans typically include an impeller, a motor and a motor shaft configured to be rotated by the motor and turn the fan impeller. The fan impeller is usually positioned in a housing with two openings to form a passage or conduit. The fan may be used to move fluids such as gas or a combustion gas/air mixture. Such fan impellers are configured, amongst others, for heating systems for providing a combustible mixture of air and gas. For instance, gas-air blowers can be installed in boilers or be used for generating heat especially designed for closed heating installations. These gas/air mixtures used for heating are ignitable. Therefore, it is especially desirable to prevent the fluid from leaking from the fan housing in direction to the motor side or to any electrical components as electrical switches disposed in the motor housing or in the vicinity thereof. Escaping gas due to improper sealing may present a danger to operators and others or may cause material damage, especially if any electrical switches or communication systems are used. It is noted that such radial fans cannot only be operated such that an overpressure is built up in the fan housing but also to establish a negative pressure in a defined area.

In conventional radial fans there are various designs available. According to one configuration part of the fan housing can be integrally built as a motor plate, wherein the motor plate has a passage opening for the motor shaft. Other configurations have the housing of the fan and the motor assembly arranged separately. Usually one or more bearings of the motor shaft are arranged on one side of the shaft passage opening of the fan housing or are partially inserted into said shaft passage opening.

A prior known solution for reducing leakage through such shaft passage openings is to provide a sealing assembly. In conventional radial fans wherein only the motor shaft extends from the motor side into the fan housing a sealing maybe disposed around the motor shaft. The sealing may be arranged to cover the gap between the motor shaft and the surrounding inner edge of the shaft passage opening. However, a gap between the seal and the motor shaft is present, either by design or following a period of use due to wear. Accordingly, fluid may leak between the seal and the motor shaft. In an attempt to overcome this problem, a plurality of seals may be provided.

A further requirement, which should be met by the seal, is to compensate tolerances of the components and compensate any offsets caused when torque is transmitted from the electric motor via the rotating shaft.

It is further known in the art that such radial fan assemblies and, in particular, their housings are inspected for leaks after assembly and before delivery to the client in order to safely exclude the undesirable and inadmissible leakage of a fluid such as gas mixtures. Accordingly, it is another object to provide a method for testing the tightness of the sealing after assembly.

Therefore, it is an object of the present invention to provide a sealing assembly to alleviate at least the above mentioned problems. One important object is to avoid during operation of the motor radial and axial displacement of at least part of the sealing which is in contact with the motorplate. It is another object to provide a sealing assembly that has not only the functionality of securely sealing. One desired object or functionality can be to ensure safety if electrical components on the motor side are in use.

SUMMARY

The present invention addresses one or more of the objects mentioned above. The problems posed are solved according to the subject-matter of the independent claims appended herewith. Aspects of the present disclosure seek to provide a sealing assembly, a method of assembling a sealing assembly, and a method for verifying tightness of a sealing assembly. Various features and advantages of the invention will be apparent from the dependent claims and are set forth in part in the following description the description and figures, respectively.

According to a first aspect of the present disclosure, there is provided a sealing assembly for sealing a shaft passage opening comprising:

a rotatable motor shaft with at least one bearing which is supported by at least one bearing support, a motor plate with a passage opening for the motor shaft with the at least one bearing, a seal having a first sealing portion and a second sealing portion, wherein the first sealing portion is arranged between at least a portion of an outer peripheral surface of the at least one bearing and a portion of the bearing support; and the second sealing portion extends radially outwardly in a direction away from the motor shaft and is fixed against radial and axial displacements on the motor plate by fixing means, wherein the second sealing portion is spaced from an edge of the passage opening.

A key advantage of the sealing assembly of the first aspect is the provision of a fixing means to fix the second sealing portion to the motor plate, which allows for a secure and tight attachment between the seal and the motor plate. Thus even if during operation radial or vertical movements of the sealing are induced at the outer boundary of the sealing the fixing means ensure that no radial or axial displacement and thus potential leakage in this region occur.

A further advantage is that only a single seal is required to sufficiently seal the shaft passage opening, instead of a plurality of seals. Another advantage of this embodiment lies in a simple and safely arrangable arrangement. Thus, greater simplicity and lower cost for manufacturing may be achieved.

In case the bearing used is of a non leaking type, the sealing assembly may seal the shaft passage opening such that a flow of a fluid such as a gas mixture through the shaft passage opening may be sufficiently restricted or completely prevented. In this regard, the seal may be fluid impermeable.

For example, the seal may be formed from silicon or any other suitable material. In this way, a fluid may not flow through the seal.

The rotatable motor shaft may connect a drive means, such as an electric motor including a rotor to a fan or an impeller. The seal is characterized by that it the outer and second sealing portion is fixed to the motor plate at a distance i.e. spaced from an edge of the passage opening. The distance from the edge of the passage opening in a vertical direction should be at least 0.1 mm. This is in contrast to sealings typically provided. As long as a sufficient distance from the edge is provided a tight sealing can be ensured when fixing the second portion on one side of the motor plate. The fixing can be done either on the side of the motor plate facing the fan or on the side facing the motor. Further, it is noted that the inner and first sealing portion is spaced apart of the motor shaft. Accordingly, the seal may not be worn due to contact with a rigid component such as a motor shaft, and no unsealed gap between the seal and the motor shaft may be present as in prior known sealing assemblies.

The bearing may be fixed onto the motor shaft. In some embodiments, a second bearing is provided. The second bearing may be fixed to the motor shaft and the bearing support without a seal. The second bearing may be provided on either side of the first bearing and the seal, however, preferably on the motor side of the first bearing such that both bearings can be supported by the same bearing support.

In the sealing assembly of the first aspect of the present disclosure, the first sealing member is positioned between at least a portion of an outer peripheral surface of the at least one bearing and a portion of the bearing support. In some embodiments, the first sealing portion is positioned between the entire outer peripheral surface of the at least one bearing and the corresponding portion of the bearing support. In this way the sealing can be secured between the respective surfaces of the bearing and the bearing support, respectively.

The motor plate may be substantially planar. The passage opening for the motor shaft may be a through hole in the motor plate, which is preferably circular and has no sharp edges. The motor plate may include attachment points for the bearing support and/or other components to be secured to the motor plate.

The first sealing portion being arranged between at least a portion of an outer peripheral surface of the at least one bearing and a portion of the bearing support may allow for some movement of the bearing relative to the bearing support. In this regard, the seal may be flexible, elastic and/or resilient. The seal may compress and/or expand to allow for minor movement of the bearing relative to the bearing support, in the manner of an expansion joint, whilst maintaining a suitable seal.

In some embodiments, the fixing means are configured to materially bond or create a form-fit and/or friction-lock between the second sealing portion and the motor plate. For example, the second sealing portion may be fixed to the motor plate with an adhesive, plastic welding, with fixings such as bolts, screws or rivets, and/or based on a geometrical correspondence between the second sealing portion and the motor plate.

In some embodiments, the fixing means comprises a fastening component attached to the motor plate, wherein the fastening component is configured and arranged to fix the second sealing portion on the motor plate. The fastening component may be annular. Alternatively, the fastening component may have a at least partially a non-circular shape, such as polygonal shape or alternatively a square or rectangular shape.

In some embodiments, the motor plate comprises one or more protruding portions and/or one or more indentations to centre and/or connect the seal and/or the fastening component via form and/or friction-lock. The protruding portion may be at least partially deformed over the fastening component to secure the fastening component and the second sealing portion on the motor plate. Any number of protruding portions may be provided such as one, two, three, four, five or six. In some embodiments, the protruding portions are arcuate, wherein each arc has its center in the center of the shaft passage opening, and together form an interrupted annular protrusion from the motor plate. The motor plate and the protruding portions may be one piece and may be manufactured as e.g. aluminium cast part. Alternatively, the protruding portions may be attached to the motor plate. In some embodiments, the protruding portions may be tabs or fingers that may be bent over to press against the fastening component and hold the fastening component and the second sealing portion in place on the motor plate.

In an alternative embodiment, the fastening component may comprise at least one through hole and the at least one protruding portion of the motor plate may pass through the through hole. A plurality of through holes and protruding portions may be provided. The protruding portion may be a rivet or a post that is deformed over the fastening component to prevent the rivet from being removed from the through hole. In some embodiments, the seal comprises a through hole in a position corresponding to the through hole in the fastening component and the rivet or post is configured to pass through both the seal and the fastening component.

In some embodiments, the fastening component is larger than the outer perimeter of the seal. In alternative embodiments, the fastening component is approximately the same size as the outer perimeter of the seal or as the surface area of the second portion of the seal such that an outer peripheral edge of the fastening component aligns with an outer peripheral edge of the seal.

A mechanical and/or hydraulic press or stamp may be provided to deform at least part of the protruding portion or the entire volume of each protruding portion. The tool of the press or stamp used to contact the protruding portions may be planar. For example, the tool may have a circular cross-section such that circular, or partially circular, indentations are made in the protruding portions. Alternatively, the tool may be non-planar and/or shaped to correspond to a shape of the protruding portions. By using a specifically designed tool or stamp, a relatively large forming force may be provided and the second sealing portion may be held against the motor plate with a sufficient force such that tightness between the second sealing portion and the motor plate is achieved. The forming force may range between 1 t to 5 t. The reliable manner in which tightness is achieved may mean that a post assembly tightness test is no more required. Accordingly, the production and quality control processes may be simplified.

In some embodiments, the fastening component is electrically conductive and comprises a protective earth contact and/or is arranged to extend radially outwardly in order to fasten a cover of a motor, wherein optionally the protective earth contact of the fastening component can be oriented in one or more predetermined directions via at least two protruding portions. A width of the protective earth contact may be substantially the same as a distance between two adjacent protruding portions.

In this way the fastening component has besides the sealing function other functionalities as a protective earth contact and/or a fastening possibility for an electronic cover. Due to the grounding possibility the safety of the system is increased. Further, the combination of several functionalities in a single part is very cost efficient In some embodiments, a plurality of predetermined directions are provided by the protruding portions. In a preferred embodiment, three equally spaced arcuate protruding portions are provided with three predetermined directions provided between the protruding portions. The three predetermined directions may be positioned 120 degrees apart such that a user may position the protective earth contact in a preferred direction. Alternatively, unequally spaced predetermined directions may be provided. Any number of protruding portions and predetermined directions may be provided. In this way the client's requirements can be addressed and accessibility of the protruding portion or finger can be increased.

In some embodiments, an electrically conductive cable may connect the protective earth contact to the electric component, which is to be grounded. By providing distinct orientation of the protruding portion of the fastening component, the one or more cable lugs may be connected at the desired orientation. In this way, a user friendly attachment mechanism may be provided. In some embodiments, the protective earth contact includes a through hole configured to receive a rivet or post extending from the motor plate. The rivet or post may be deformed over the fastening component to provide a permanent and relative low resistance electrical connection between the fastening component and the motor plate.

In some embodiments, the seal comprises a third sealing portion, intermediate the first sealing portion and the second sealing portion, wherein the third sealing portion has at least one arcuate shape and is disposed radially inwardly from the second sealing portion.

In some embodiments, the third sealing portion extends into the passage opening and passes from the second sealing portion through the motor plate via the passage opening, further wherein the third sealing portion is configured and arranged to be straight and/or have a different curvature after passing through the motor plate to extend to the first sealing portion.

In some embodiments, the first sealing portion is arranged substantially axially between the portion of the outer peripheral surface of the at least one bearing and the portion of the bearing support and/or wherein the first sealing portion has a substantially L-shaped cross-section having at its radially inward end a substantially horizontal seal member to be securely fitted between opposing sealing surfaces of the bearing support and one of the bearing or a washer.

By providing a L-shaped cross section of the first sealing portion, the end portion of the first sealing portion is fixedly secured even if the adjacent bearing slightly moves in radial and/or axial direction.

In some embodiments, the second sealing portion comprises an annular enlargement along or in the proximity of an outer circumference of the second sealing portion. In other embodiments, the second sealing portion comprises an enlarged part adjacent to a peripheral edge of the second sealing portion. The enlarged part may have a cross-sectional area that is greater than a cross-sectional area of an adjacent part of the second sealing portion. In a preferred embodiment, the annular enlargement or the enlarged part is clamped between the motor plate and the fastening component. In this way, a tight and reliable seal between the motor plate and the seal is achieved.

In some embodiments, the motor shaft includes a rotor operable to rotate the motor shaft. The rotor may be pressed onto the motor shaft or otherwise fixed to the motor shaft. The rotor may form part of a drive means such as an electric motor including a stator. The second sealing portion may be fixed to either side, or both sides, of the motor plate. In a preferred embodiment, the second sealing portion is fixed to a side of the motor plate facing the rotor. As discussed in more detail below, the motor shaft may comprise an impeller.

In some embodiments, the seal is rotationally symmetric about an axis, further wherein the first sealing portion is located at a first radius from the axis and the second sealing portion is located at a second radius from the axis, and the second radius is greater than the first radius, optionally the second radius being between 15 mm and 80 mm. Additionally the first radius is spaced from the motor shaft. Preferred radial dimensions of the seal are ranging between 15 mm and 80 mm, whereas preferred axial dimensions of the seal are ranging between 0.5 mm and 20 mm. Other dimensions are possible and depend on the dimensions of the involved components such as the shaft passage opening and the bearing. According to a second aspect of the present disclosure, there is provided a method for assembling a sealing assembly comprising the following method steps: providing a motor plate with a passage opening; inserting a seal comprising a first sealing portion and a second sealing portion at least partially into the passage opening such that the second sealing portion is spaced from an edge of the passage opening; and fixing the second sealing portion to the motor plate.

After the method step of fixing, the contacting horizontal surface of the second portion of the seal with the motor plate is preferably spaced at least 0.1 mm from the edge of the passage opening. For example, distances may range between 2 mm and 7 mm. Preferred distances to the edge of the passage opening are approximately 3 mm, 4 mm, 5 mm and 6 mm, or within any range created with these distances.

After the above method steps are completed a pre-assembled sealing assembly is provided. That is to say, the method of the second aspect may be a preassembly method used to preassemble the motor plate, seal and fastening component to form a single sub-assembly that may then be used as a component in a further assembly method, such as assembling a motorised fan assembly.

Accordingly the pre-assembled sealing assembly can be used for assembly steps, such as arranging at least one bearing, optionally with a washer, adjacent to the first sealing portion of the seal such that the first sealing portion is configured to bear against at least a portion of an outer peripheral surface of the at least one bearing.

In some embodiments, the motor plate includes one or more protruding portions and/or identations and the step of fixing the second sealing portion to the motor plate includes:
positioning the second sealing portion adjacent to a radially inwardly facing side of the one more protruding portions of the motor plate;
positioning a fastening component on the second sealing portion such that the second sealing portion is arranged between the motor plate and the fastening component; and pressing a portion of the one or more protruding portions on the fastening component such that the fastening component and the second sealing portion are retained via an form-fit and/or friction-lock.

The protruding portion may be plastically deformed to permanently hold the fastening component and the second sealing portion in position on the motor plate. A force of at least 10 kN may be applied to the protruding portion to deform the protruding portion. Other magnitudes of force are envisaged, and the force applied may be dependent on the geometry and material of the protruding portion. For example, a force of approximately 49 kN or 5 t has been found to be sufficient to deform a protruding portion formed of cast or machined aluminium and provide a very reliable holding force to ensure a tight second sealing portion.

According to a third aspect of the present disclosure, there is provided a method for verifying tightness of the sealing assembly of the first aspect and further comprising a motor coupled to an end of the motor shaft in a motor housing and a fan coupled to another end of the motor shaft in a fan housing; the method comprising the following method steps:
providing at least one sealed bearing or sealing the at least one bearing; increasing a pressure and/or providing a test gas selected from inert gases, nitrogen, noble gases or combination thereof preferably on the fan side of the sealing assembly; and detecting one or more of a pressure change over time, a flow rate or a test gas in order to verify the tightness of the sealing assembly.

If the bearing is configured to be a roller bearing, which usually are not tight, there is the need to seal the bearing temporarily in order to test the tightness of the remaining seal. Alternatively the bearing itself can be chosen to be temporarily or permanently sealed. A further alternative tightness test configuration is to provide an additional sealing element or a modified shaft sealing. After providing a tightness test configuration, wherein for instance the bearing is sealed, a tightness test can easily and simply performed by common tightness methods such as introducing an inert gas as nitrogen or increasing the pressure on the side of the fan housing. These tightness tests are cost efficient and can easily be performed after assembling the radial fan with the sealing assembly by the manufacturer or by the client.

BRIEF DESCRIPTION OF THE FIGURES

Various features and advantages of the invention will be set forth in part in the following description of Figures referring to various examples of the invention. In this context it is noted that the dimensions shown in all Figures of this disclosure are not to scale. The illustrations are simplified and not in each Figure all components are indicated with reference numerals and like reference numerals may be carried forward. In this description reference is made to the accompanying Figures, in which.

DETAILED DESCRIPTION

Figure 1:
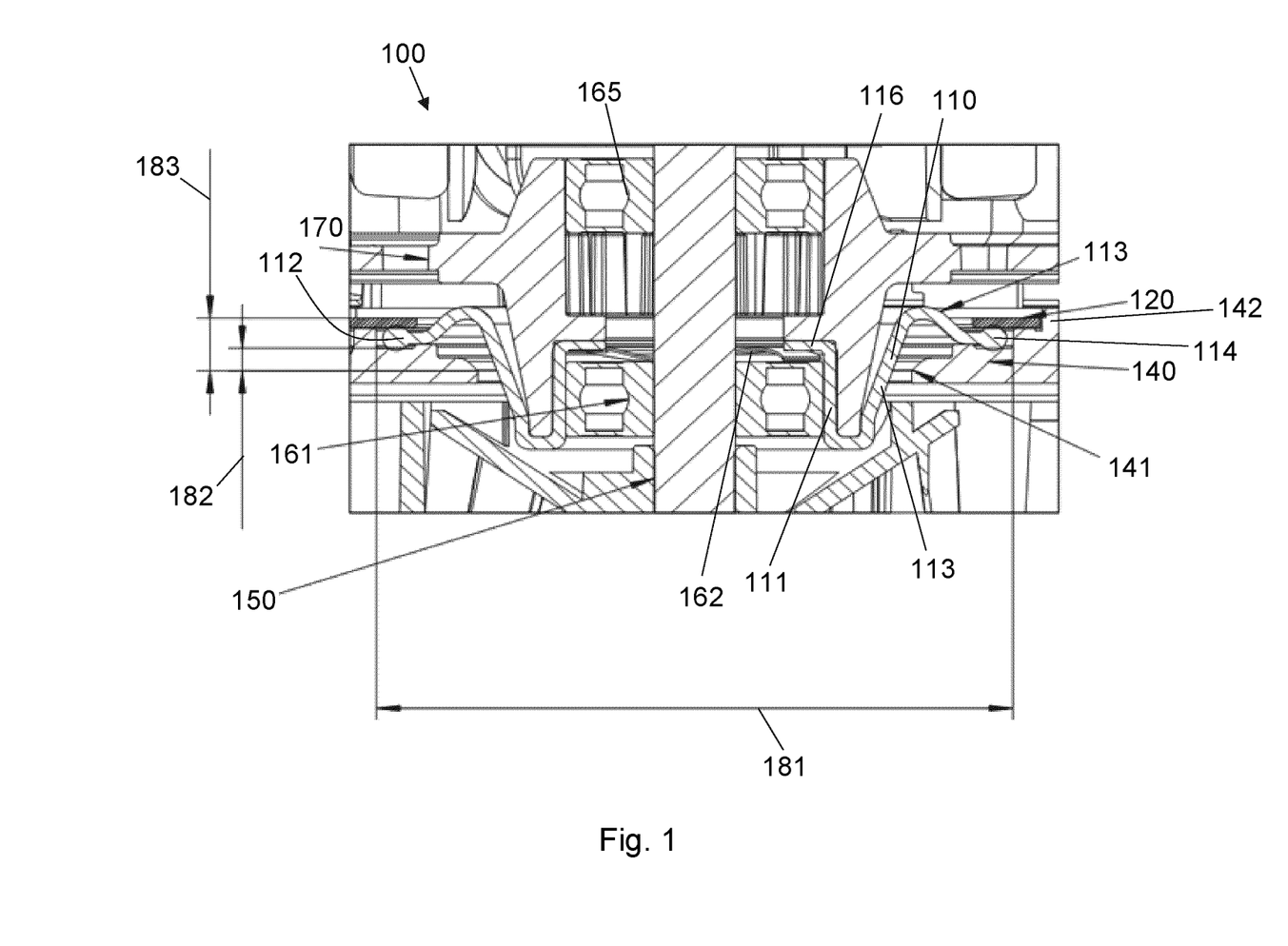
FIG. 1 is a cross-sectional view of a sealing assembly.

FIG. 1 is a cross-sectional view of a sealing assembly 100. The sealing assembly 100 includes a seal 110. The seal 110 is clamped between a fastening component 120 and a motor plate 140. A motor shaft 150 passes through the seal 110 and a passage opening 141 in the motor plate 140. A lower bearing 161 and an upper bearing 165 are positioned on the motor shaft 150 to allow for rotation of the motor shaft 150 relative to the motor plate 140. A bearing support 170 is also provided to support the upper bearing 165 and the lower bearing 161.

The seal 110 is arranged to seal the passage opening 141 between the lower bearing 161, the bearing support 170 and the motor plate 140. The seal 110 includes a first sealing portion 111, a second sealing portion 112, and a third sealing portion 113 positioned between the first sealing portion 111 and the second sealing portion 112. A preferred shape of the seal 110 is discussed in more detail with reference to FIG. 3.

The second sealing portion 112 includes an annular enlargement 114 at an outer peripheral edge of the seal 110. The annular enlargement 114 has a larger cross-sectional area than the other parts of the seal 110. The annular enlargement 114 is arranged such that it is clamped between the fastening component 120 and the motor plate 140. A relatively large clamping or holding force may be applied such that the annular enlargement 114 is deformed and fits tightly against the motor plate 140, to seal the passage opening 141 and prevent radial or axial displacement of the second sealing portion 112. In one preferred embodiment, the motor plate 140 may provide protruding portions, which are at least partially deformed (not shown in the cross-section of FIG. 1) to hold down the fastening component 120 for a strong sealing of the second portion 112.

The first sealing portion 111 is positioned between an outer peripheral surface of the lower bearing 161 and the bearing support 170. Therefore, the connection between the lower bearing 161 and the bearing support 170 is sealed. The seal 110 also includes a horizontal seal member 116 that is arranged to partially overlap an upper surface of the lower bearing 161. Accordingly the first sealing portion 111 has a substantially L-shaped cross-section having at its radially inward to be securely fitted between opposing sealing surfaces. An optional washer 162 may be provided between the lower bearing 161 and the horizontal seal member 116 (see FIG. 3). In case the lower bearing 161 is moving in radial direction, the first sealing portion 111 can flexibly compensate such movements. Similarly, axial movements of the bearing 161 do not effect the sealing functionality.

The only areas of the sealing assembly 100 that may remain unsealed are the lower bearing 161. To prevent small flows through the bearing, a permanently sealed bearing should be selected. Alternatively, an additional sealing or a modified shaft sealing may be provided.

As shown in FIG. 1, part of the bearing support 170 and the lower bearing 161 are inserted in the shaft passage opening 141 such that passage opening 141 has to have a sufficiently wide diameter. In order to ensure that the outer radial edge and thus the second sealing portion 112 is spaced apart from the shaft passage opening the sealing assembly 100 is configured to have a relatively large radial dimension 181. Preferred radial dimensions 181 range between 15 mm and 80 mm.

The seal 110 passes from the top of the motor plate 140, at the second sealing portion 112, down through the passage opening 141 and back up into the passage opening 141 at the first sealing portion 111. Accordingly, the seal 110 passes across the entire passage opening 141. There is an minimum axial distance from the shaft passage opening 141 to the top of the motor plate 140, on which the second sealing portion 112 is fixed, which should be at least 0.1 mm. Providing a distance to the edge of the shaft passage opening ensures that a secure fixing of the outer boundary of the seal can be provided. Down holding forces can be applied in an annular region of the motor plate, which is spaced from the shaft passage opening 141.

Additionally, an axial dimension 183 of the seal 110 from the passage opening 141 to the upper edge of the fastening component 120 is shown in FIG. 1 with reference numeral 183, which dimension may range between 0.5 mm and 20 mm. Said axial dimension 183 extending above the level of the shaft passage opening 141 is limited by a vertex of a curvature of the third sealing portion. Thus close to the second sealing portion 112 until the vertex there is no contact of the third sealing portion 113 with the motor plate 140. From the vertex the curvature of the third sealing portion 113 extends into the passage opening 141 and passes from the second sealing portion 112 through the motor plate 140 via the passage opening 141. Further, the third sealing portion 113 is configured and arranged to be straight and/or have a different curvature after passing through the motor plate 140 to extend to the first sealing portion 111. By providing at least two curvatures or a S-like shape of the third portion 113 renders the seal 110 more flexible in the radial direction. Thus any tolerances of the components of bearing support 170 und rotor 151 can easily be compensated. That is to say the third portion 113 of the seal may serve as a compensator which can compensate a radial or axial offset of the adjacent components when torque of the electric motor is transmitted.

Figure 2:
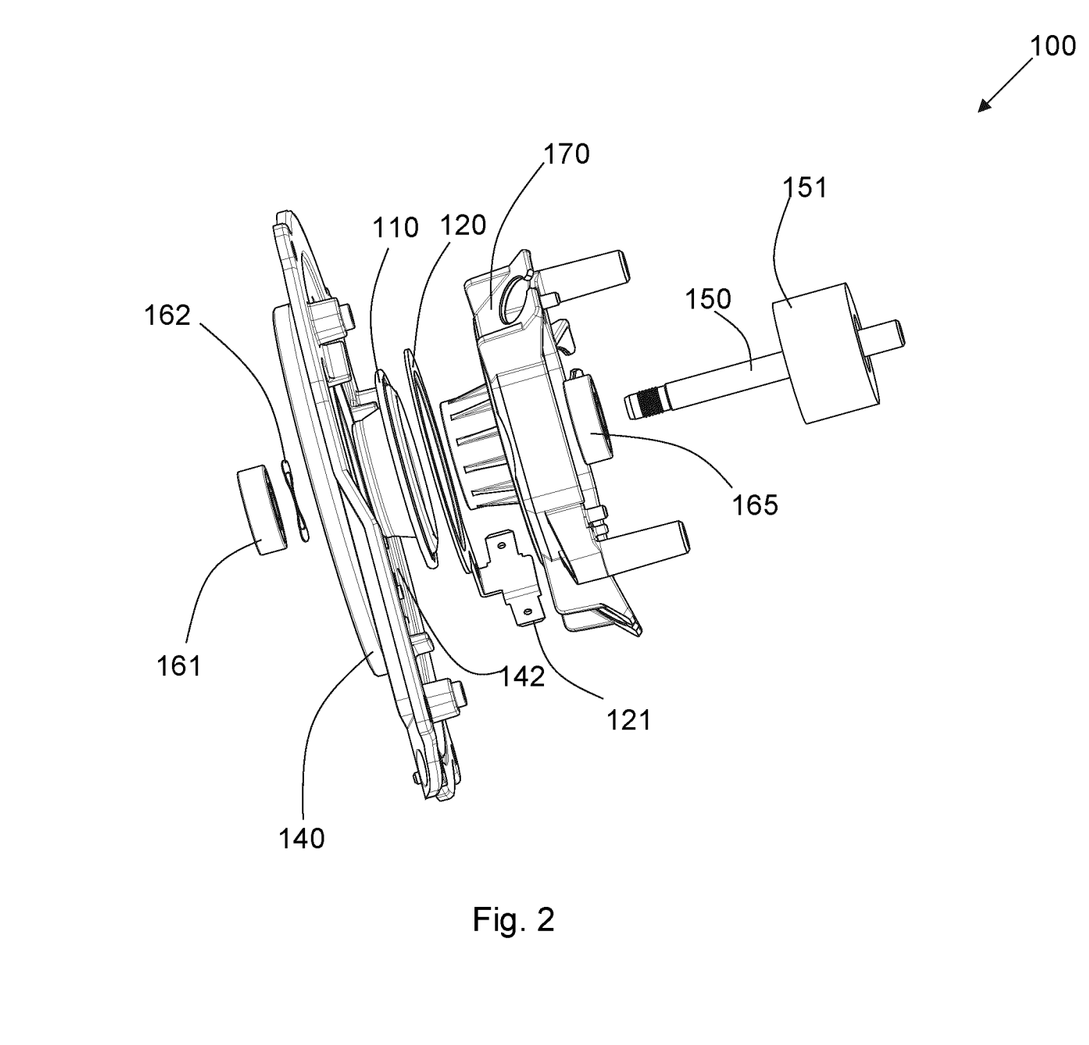
FIG. 2 is an exploded view of the sealing assembly shown in FIG. 1.

FIG. 2 is an exploded view of the sealing assembly 100 shown in FIG. 1. To assemble the sealing assembly 100, the seal 110 may first be positioned on the motor plate 140. The fastening component 120 may then be positioned within a set of protruding portions on the motor plate 140, such that the second sealing portion 112 is positioned between the motor plate 140 and the fastening component 120. The protruding portions on the motor plate 140 can be deformed with a stamping process to retain the fastening component 120 on the motor plate 140, with the second sealing portion 112 clamped therebetween. The steps described above may be considered to be a pre-assembly.

Figure 4:
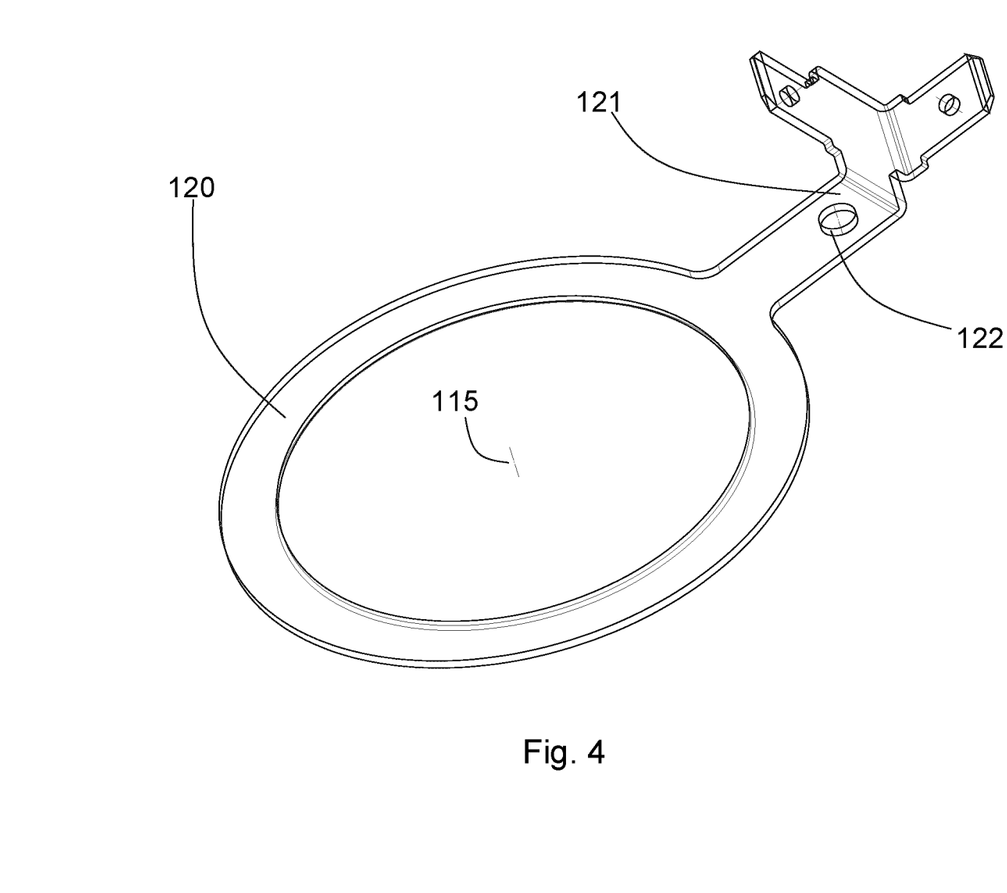
FIG. 4 is a perspective view of the fastening component of the sealing assembly shown in FIG. 1.

Advantageously, the fastening component 120 includes a protective earth contact 121 that is attached to the motor plate 140, as discussed and shown in more detail with reference to FIG. 4. The lower bearing 161 may be positioned, optionally with a washer 162, adjacent to the first sealing portion 111. The pre-assembly may further be combined with the remaining parts of the sealing assembly such as the bearing support 170. After the sealing assembly 100 is fully assembled the pre-assembly, consisting of the seal 110 fastened to the motor plate 140 by means of the fastening component 120, is positioned on a lower side of the bearing support 170. A motor shaft 150, with a rotor 151 and an upper bearing 165 fixed thereto is configured to be inserted in the bearing support 170, the fastening component 120, the seal 110 and the shaft passage opening 141 of the motor plate 140. The lower bearing 161 and the upper bearing 165 are pressed onto the motor shaft 150 according to common techniques. The bearing 161 and is preferably configured as a floating bearing whereas the upper bearing 165 is preferably configured as a fixed bearing. After assembling the sealing assembly the first sealing portion 111 is positioned between the bearing support 170 and the lower bearing 161. An impeller (not shown in FIG. 2) may be attached to the end of the motor shaft 150 opposite the rotor 151.

Figure 3:
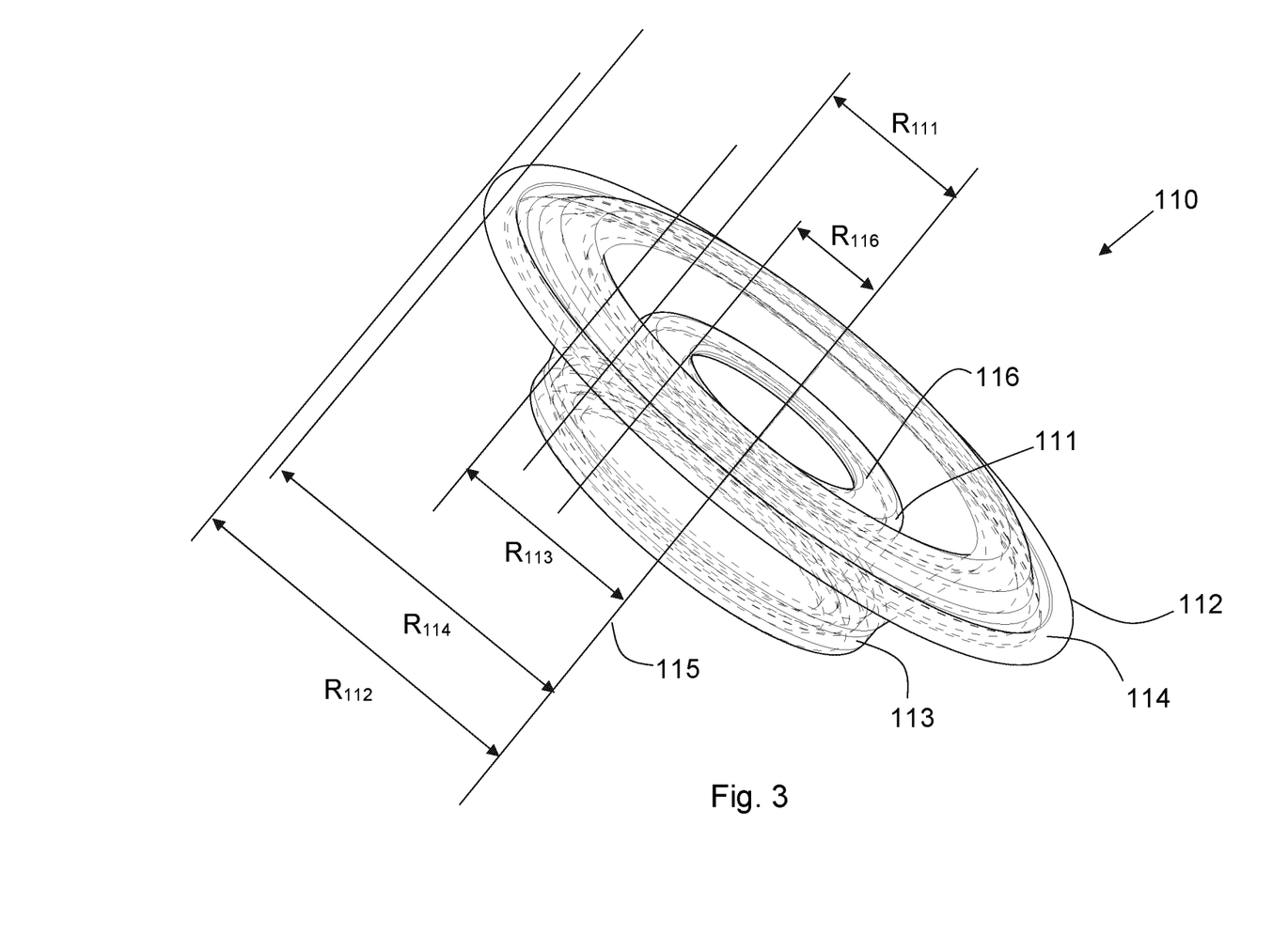
FIG. 3 is a perspective view of the seal of the sealing assembly shown in FIG. 1.

FIG. 3 is a perspective view of the seal 110 of the sealing assembly 100 shown in FIG. 1. The seal 110 has the form of a non-planar annulus and may be formed of a resilient material such as silicon. As discussed with reference to FIG. 1, the seal 110 has a first sealing portion 111, a second sealing portion 112 and a third sealing portion 113. The first sealing portion 111 extends substantially axially at a first radius $R_{111}$, with reference to a central axis 115. The third sealing portion 113 extends from a lower edge of the first sealing portion 111 and forms with regard to the adjacent first sealing portion 111 an angle of at least approximately 30 degrees relative to the central axis 115. Other angles than shown are also possible and depend on the dimension of the shaft passage opening 141. The third sealing portion 113 extends axially beyond an upper edge of the first sealing portion 111, forms a curvature with a vertex and joins the second sealing portion 112. An outer peripheral edge of the second sealing portion 112 is arranged at a second radius $R_{112}$, which is greater than the first radius $R_{111}$. The vertex of the curvature of the third sealing portion 113 is positioned at a third radius $R_{113}$. By providing a curvature at radius $R_{113}$ and another curvature bended into the other direction at the connecting region between sealing portion 113 and sealing portion 111 in the vicinity of the first radius $R_{111}$ a S-like form or Z-form with an upper curved leg at $R_{113}$ is formed. This specifically multiple curved shape of the third portion 113 renders the seal 110 more flexible in the radial direction.

The second sealing portion 112 extends away from the third sealing portion 113 at an angle of approximately 45 degrees relative to a radial plane. The second sealing portion 112 includes an annular enlargement 114 adjacent to the outer peripheral edge of the second sealing portion. The annular enlargement 114 is positioned at a fourth radius $R_{114}$ from the central axis, greater than the third radius $R_{113}$ and less than the second and outer radius $R_{112}$. The annular enlargement 114 is configured to be clamped between the motor plate and the fastening component, as discussed with reference to FIG. 1, to provide a desirable seal.

Additionally, the seal 110 includes a horizontal seal member 116, which extends radially inwardly from the upper edge of the first sealing member 111 to an innermost radius $R_{116}$. Once assembled, the first sealing portion 111 is configured to be positioned, at least partially, between the bearing and bearing support. Furthermore, the horizontal seal member 116 is configured to overlap an upper surface of the bearing, optionally with a washer positioned between the bearing and the horizontal seal member 116.

FIG. 4 is a perspective view of the fastening component 120 of the sealing assembly 100 shown in FIG. 1. The fastening component 120 includes an annular portion that has a radius similar to the outermost radius $R_{112}$ of the second sealing portion 112 of the seal 110, as shown in FIG. 3. The fastening component 120 is formed of an electrically conductive material and includes a protective earth contact 121. The protective earth contact 121 includes a through hole 122. During assembly of the sealing assembly 100, the fastening component 120 is placed on the motor plate, over the seal, such that a rivet or post on the motor plate is received within the through hole 122. The rivet or post may then be deformed to prevent the rivet or post being removed from the through hole 122. Accordingly, a secure electrical connection may be achieved. Although not shown, an electrically conductive cable may be attached, via a cable shoe or lug, to the protective earth contact 121. In alternative embodiments in addition a plurality of protruding elements can be built such as the protective earth contact and connect a cover for the motor. In use, the fastening component 120 may be arranged in any suitable orientation with the protective earth contact 121 projecting out radially in any desirable direction, such that the accessibility for connecting cables and the like is ensured. In case three arcuate protruding portions are provided on the cover plate the protective earth contact 121 can be oriented in three directions, which may be equally distanced from each other by 120 degrees. Depending on the required access other orientations are envisable.

Use of ordinal terms such as "first," "second," "third," and the like does not by itself connote any priority, precedence, or order of one claim element over another, but are used merely as labels to distinguish one element having a certain name from another element having a same name (but for use of the ordinal term) to distinguish the elements. It is noted that the terms "upper" and "lower" used herein are not intended to be limiting.

REFERENCE LIST

100 Sealing Assembly
110 Seal
111 First Sealing Portion
112 Second Sealing Portion
113 Third Sealing Portion
114 Annular Enlargement
115 Central Axis of the Seal
116 Horizontal Seal Member
$R_{111}$ Radius of First Sealing Portion
$R_{112}$ Outermost Radius of Second Sealing Portion
$R_{113}$ Exemplary Radius of Third Sealing Portion
$R_{114}$ Radius of Annular Enlargement
$R_{116}$ Innermost Radius of Horizontal Seal Member
120 Fastening Component
121 Protective Earth Contact
122 Through Hole in Protective Earth Contact
140 Motor Plate
141 Passage Opening
142 Protruding Portion
150 Motor Shaft
151 Rotor
161 First Bearing
162 Washer
165 Second Bearing
170 Bearing Support
181 Radial Dimension of the Sealing Assembly
182 Axial Distance from the Shaft Passage Opening to the top of the Motor Plate being the contact surface to the second sealing portion
183 Axial Dimension of the Seal from the Shaft Passage Opening to the upper edge of the Fastening Component

The invention claimed is:

1. A sealing assembly for sealing a shaft passage opening comprising:
    a rotatable motor shaft with at least one bearing which is supported by at least one bearing support,
    a motor plate with a passage opening for the rotatable motor shaft with the at least one bearing,
    a seal having a first sealing portion and a second sealing portion,
        wherein the first sealing portion is arranged between at least a portion of an outer peripheral surface of the at least one bearing and a portion of the at least one bearing support; and
        the second sealing portion extends radially outwardly in a direction away from the rotatable motor shaft and is fixed against radial and axial displacements on the motor plate by a fastening component configured and arranged to fix the second sealing portion on the motor plate,
        wherein the fastening component is configured to create a form-fit, a friction lock, or combination thereof, between the second sealing portion and the motor plate,
    wherein the motor plate comprises one or more protruding portions, one or more indentations, or combination thereof, to connect the second sealing portion and the fastening component,
    wherein the second sealing portion is positioned adjacent to a radially inwardly facing side of the one or more protruding portions,
    wherein the second sealing portion is arranged between the motor plate and the fastening component.

2. The sealing assembly according to claim 1, wherein the one or more protruding portions and/or one or more indentations of the motor plate are configured to center the seal, the fastening component, or combination thereof.

3. The sealing assembly according to claim 2, wherein the fastening component is electrically conductive and comprises a protective earth contact and/or is arranged to extend radially outwardly in order to fasten a cover of a motor, wherein optionally the protective earth contact of the fastening component can be oriented in one or more predetermined directions via at least two protruding portions.

4. The sealing assembly according to claim 3, wherein the seal comprises a third sealing portion, intermediate the first sealing portion and the second sealing portion, wherein the third sealing portion has at least one arcuate shape and is disposed radially inwardly from the second sealing portion.

5. The sealing assembly according to claim 1, wherein the seal comprises a third sealing portion, intermediate the first sealing portion and the second sealing portion, wherein the third sealing portion has at least one arcuate shape and is disposed radially inwardly from the second sealing portion.

6. The sealing assembly according to claim 5, wherein the third sealing portion extends into the passage opening and passes from the second sealing portion through the motor plate via the passage opening, further wherein the third sealing portion is configured and arranged to be straight and/or have a different curvature after passing through the motor plate to extend to the first sealing portion.

7. The sealing assembly according to claim 6, wherein the first sealing portion is arranged axially between the portion of the outer peripheral surface of the at least one bearing and the portion of the at least one bearing support and/or wherein the first sealing portion has an L-shaped cross-section having at its radially inward end a horizontal seal member to be securely fitted between opposing sealing surfaces of the at least one bearing support and one of the at least one bearing or a washer.

8. The sealing assembly according to claim 1, wherein the first sealing portion is arranged axially between the portion of the outer peripheral surface of the at least one bearing and the portion of the at least one bearing support and/or wherein the first sealing portion has an L-shaped cross-section having at its radially inward end a horizontal seal member to be securely fitted between opposing sealing surfaces of the at least one bearing support and one of the at least one bearing or a washer.

9. The sealing assembly according to claim 8, wherein the seal is resilient.

10. The sealing assembly according to claim 1, wherein the seal is resilient.

11. The sealing assembly according to claim 1, wherein the second sealing portion comprises an annular enlargement along or in the proximity of an outer circumference of the second sealing portion.

12. The sealing assembly according to claim 1, wherein the rotatable motor shaft includes a rotor operable to rotate the rotatable motor shaft, and the second sealing portion is fixed to a side of the motor plate facing the rotor.

13. The sealing assembly according to claim 1, wherein the seal is rotationally symmetric about an axis, further wherein the first sealing portion is located at a first radius from the axis and the second sealing portion is located at a second radius from the axis, and the second radius is greater than the first radius and wherein the first radius is spaced from the rotatable motor shaft.

14. A method for verifying tightness of the sealing assembly of claim 1 and further comprising a motor coupled to an end of the rotatable motor shaft in a motor housing and a fan coupled to another end of the rotatable motor shaft in a fan housing; the method comprising:
    providing at least one sealed bearing or sealing the at least one bearing;
    increasing a pressure and/or providing a test gas selected from inert gases, nitrogen, noble gases or combination thereof on the fan side of the sealing assembly; and
    detecting one or more of a pressure change over time, a flow rate or the test gas in order to verify the tightness of the sealing assembly.

15. A method for assembling a sealing assembly comprising:
    providing a motor plate with a passage opening;
    inserting a seal comprising a first sealing portion and a second sealing portion at least partially into the passage opening such that the second sealing portion is spaced from an edge of the passage opening; and
    fixing the second sealing portion to the motor plate;
    wherein the motor plate includes one or more protruding portions and/or one or more indentations and wherein the fixing the second sealing portion to the motor plate includes:
        positioning the second sealing portion adjacent to a radially inwardly facing side of the one or more protruding portions of the motor plate;
        positioning a fastening component on the second sealing portion such that the second sealing portion is arranged between the motor plate and the fastening component; and
    pressing a portion of the one or more protruding portions on the fastening component such that the fastening component and the second sealing portion are retained via a form-fit and/or friction-lock.

* * * * *

UNITED STATES PATENT AND TRADEMARK OFFICE
CERTIFICATE OF CORRECTION

PATENT NO. : 12,480,517 B2
APPLICATION NO. : 18/555579
DATED : November 25, 2025
INVENTOR(S) : Kay Jarysek et al.

It is certified that error appears in the above-identified patent and that said Letters Patent is hereby corrected as shown below:

On the Title Page

Item (57) ABSTRACT
DELETE:
"a seal (110) having a first scaling portion (111) and a second scaling portion (112), wherein the first sealing portion (111) is arranged between at least a portion of an outer peripheral surface of the at least one bearing (161) and a portion of the bearing support (170); and the second scaling portion (112) extends radially outwardly in a direction away from the motor shaft (150)"
And REPLACE with:
--"a seal (110) having a first sealing portion (111) and a second sealing portion (112), wherein the first sealing portion (111) is arranged between at least a portion of an outer peripheral surface of the at least one bearing (161) and a portion of the bearing support (170); and the second sealing portion (112) extends radially outwardly in a direction away from the motor shaft (150)"--

Signed and Sealed this
Thirteenth Day of January, 2026

John A. Squires
*Director of the United States Patent and Trademark Office*